US012717764B2

(12) United States Patent
Kabia

(10) Patent No.: US 12,717,764 B2
(45) Date of Patent: Aug. 25, 2026

(54) SYSTEMS AND METHODS FOR GENERATING DATA HAVING A SUSTAINABLE QUALITY

(71) Applicant: JPMORGAN CHASE BANK, N.A., New York, NY (US)

(72) Inventor: Amy Kabia, Chappaqua, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 14 days.

(21) Appl. No.: 18/160,666

(22) Filed: Jan. 27, 2023

(65) Prior Publication Data

US 2024/0256504 A1 Aug. 1, 2024

(51) Int. Cl.
*G06F 16/215* (2019.01)
*G06F 16/28* (2019.01)

(52) U.S. Cl.
CPC .......... *G06F 16/215* (2019.01); *G06F 16/285* (2019.01)

(58) Field of Classification Search
CPC ............................ G06F 16/215; G06F 16/285
See application file for complete search history.

(56) References Cited

U.S. PATENT DOCUMENTS 7,424,702 B1 * 9/2008 Vinodkrishnan ...... G06Q 10/06 717/124
2011/0066647 A1 * 3/2011 Chan .................. G06F 16/2471 707/E17.014
2013/0055042 A1 * 2/2013 Al Za'noun ..... G06Q 10/06395 714/E11.023
2013/0159449 A1 * 6/2013 Taylor ....................... G06F 9/54 709/212
2014/0379665 A1 * 12/2014 Benjamin .............. G06Q 40/00 707/769
2015/0149354 A1 * 5/2015 McCoy .................. G06F 3/167 705/42
2019/0361878 A1 * 11/2019 Rogynskyy .......... G06Q 10/107

(Continued)

OTHER PUBLICATIONS

"Improving Data Quality by Using Feedback Loops", Eva Murray, Exasol Insights Blog, Sep. 2020, https://www.exasol.com/resource/data-quality-and-the-feedback-loop/ (Year: 2020).*

*Primary Examiner* — Apu M Mofiz
*Assistant Examiner* — Farhad Agharahimi
(74) *Attorney, Agent, or Firm* — GREENBERG TRAURIG LLP

(57) ABSTRACT

Systems and methods for generating data having a sustainable quality are disclosed. A method may include: receiving, by a computer program, an identification of a data quality owner for data to be produced; receiving, by the computer program, an identification of data consumer of the data to be produced; receiving, by the computer program, a design for a data product; receiving, by the computer program, a process for producing the data; receiving, by the computer program, a process for distributing the data; producing, by the computer program, the data according to the design and the process for producing the data; distributing, by the computer program, the data according to the process for distributing the data; receiving, by the computer program, feedback on the data; and updating, by the computer program, the design and/or the process for producing the data based on the feedback.

6 Claims, 5 Drawing Sheets

(56) References Cited

U.S. PATENT DOCUMENTS

| | | | | |
|---|---|---|---|---|
| 2020/0334282 | A1* | 10/2020 | Dasgupta | G06N 3/045 |
| 2021/0124637 | A1* | 4/2021 | Pham | G06F 11/0784 |
| 2022/0276920 | A1* | 9/2022 | Martin | G06F 11/0793 |
| 2023/0284178 | A1* | 9/2023 | Parker | G01S 5/01 455/456.1 |

* cited by examiner

| Data Creation | Data Type | | | |
|---|---|---|---|---|
| | Facts | Classifications | Transactional Data | Analytical Data |
| Manual entry | • Validation rules<br>• Comparison to authoritative source<br>• Sample testing | • Validation rules<br>• Sample testing | • Validation rules<br>• Variance triggers<br>• Reconciliations<br>• Sample testing | NA |
| Vendor sourced | • Validation rules<br>• Sample testing | • Validation rules<br>• Sample testing | NA | • Validation rules<br>• Variance triggers |
| Automated extraction | • Validation rules<br>• Sample testing | NA | NA | NA |
| Derived or calculated | NA | NA | NA | • Validation rules<br>• Variance triggers<br>• Variance analysis |

FIGURE 4

SYSTEMS AND METHODS FOR GENERATING DATA HAVING A SUSTAINABLE QUALITY

BACKGROUND OF THE INVENTION

1. Field of the Invention

Embodiments relate generally to systems and methods for generating data having a sustainable quality.

2. Description of the Related Art

Organizations, such as financial institutions, produce tremendous amounts of data every day, including data about counterparties, instruments, transactions, and more. This data is critically important for serving clients, managing risk, complying with regulations, and reporting to shareholders. Additionally, this data powers artificial intelligence algorithms that are transforming operational processes as well as products and services offered to clients. Data has moved out of the back office and into the front-office. Data quality will determine the success or failure of data services products.

While the value of data has grown exponentially over the last 20 years, the processes for creating data and managing data have not advanced at the same rate. Key drivers inhibiting institutions from achieving sustainable data quality include a lack of planning and design, a lack of feedback loops, a reluctance to be accountable for data quality, and the use of data that is not fit for its purpose. For example, new data elements are typically created without sufficient thought given to who will be responsible for the data quality, how will the data element be designed, where it will be stored, and how it will be distributed.

Next, data consumers typically do not know who is producing the data they use, and data producers typically do not know who is consuming the data they create. As a result, there is no feedback loop. Data consumers get frustrated when data does not meet their requirements, yet data producers are seldom aware there is a problem.

Further, in a large organization, data often travels through many systems before it is used, for example, in a risk calculation or a financial report. When a data consumer raises an issue, it can be difficult to determine where in the data flow something went wrong. Large amounts of computer code exist between data producers and data consumers. The code joins, enriches, and transforms the data. Often what is perceived as a data quality issue is not; however, few people have the knowledge or experience to identify the root cause. As a result, there is a reluctance to be accountable for data quality.

Finally, a common reason data is perceived as poor quality is because it is not "fit-for-purpose" for a given use case. This scenario occurs because when new business requirements arise, it is easier to use an existing data element than to create a new one, even if the existing one isn't exactly what is needed. This decision is often made without a thorough understanding of the consequences.

SUMMARY OF THE INVENTION

Systems and methods for generating data having a sustainable quality are disclosed. According to one embodiment, a method for generating data having a sustainable quality may include: (1) receiving, by a computer program, an identification of a data quality owner for data to be produced; (2) receiving, by the computer program, an identification of data consumer of the data to be produced; (3) receiving, by the computer program, a design for a data product; (4) receiving, by the computer program, a process for producing the data; (5) receiving, by the computer program, a process for distributing the data; (6) producing, by the computer program, the data according to the design and the process for producing the data; (7) distributing, by the computer program, the data according to the process for distributing the data; (8) receiving, by the computer program, feedback on the data; and (9) updating, by the computer program, the design and/or the process for producing the data based on the feedback.

In one embodiment, the data quality owner may be identified based on a data type.

In one embodiment, the data type may include one of facts, functional classification, regulatory classification, transactional data, and analytical data.

In one embodiment, the data quality owner may be identified using a decision tree.

In one embodiment, the design for the data product may include a data container and data content.

In one embodiment, the method may also include automatically labeling the data container based on a data element name, description, an intended use for the data, and/or system of record.

In one embodiment, the process for producing the data may be generated using a trained machine learning engine.

In one embodiment, the method may also include identifying, by the computer program, data quality controls on the process for producing data.

In one embodiment, the method may also include validating, by the computer program, the data produced.

In one embodiment, the method may also include scoring, by the computer program, a data quality of the data based on an output of the validation.

According to another embodiment, a non-transitory computer readable storage medium, may include instructions stored thereon, which when read and executed by one or more computer processors, cause the one or more computer processors to perform steps comprising: receiving an identification of a data quality owner for data to be produced; receiving an identification of data consumer of the data to be produced; receiving a design for a data product; receiving a process for producing the data; receiving a process for distributing the data; producing the data according to the design and the process for producing the data; distributing the data according to the process for distributing the data; receiving feedback on the data; and updating the design and/or the process for producing the data based on the feedback.

In one embodiment, the data quality owner may be identified based on a data type.

In one embodiment, the data type may include one of facts, functional classification, regulatory classification, transactional data, and analytical data.

In one embodiment, the data quality owner may be identified using a decision tree.

In one embodiment, the design for the data product may include a data container and data content.

In one embodiment, the non-transitory computer readable storage medium may also include instructions stored thereon, which when read and executed by one or more computer processors, cause the one or more computer processors to perform steps comprising: automatically labeling the data container based on a data element name, description, an intended use for the data, and/or system of record.

In one embodiment, the process for producing the data may be generated using a trained machine learning engine.

In one embodiment, the non-transitory computer readable storage medium may also include including instructions stored thereon, which when read and executed by one or more computer processors, cause the one or more computer processors to perform steps comprising: identifying data quality controls on the process for producing data.

In one embodiment, the non-transitory computer readable storage medium may also include including instructions stored thereon, which when read and executed by one or more computer processors, cause the one or more computer processors to perform steps comprising: validating the data produced.

In one embodiment, the non-transitory computer readable storage medium may also include including instructions stored thereon, which when read and executed by one or more computer processors, cause the one or more computer processors to perform steps comprising: scoring a data quality of the data based on an output of the validation.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

FIG. 4 depicts examples of the types of controls that are commonly used for a given data type and data creation mechanism.

DETAILED DESCRIPTION OF PREFERRED EMBODIMENTS

Embodiments relate generally to systems and methods for generating data having a sustainable quality.

Embodiments are based on the philosophy that data is a product and manufacturing data requires the same level of rigor as manufacturing durable goods. For example, when companies that manufacture durable goods design a new product, they also design the manufacturing process that will produce the product. They consider the technology, processes, and controls needed to produce high quality output, consistently.

Embodiments combine the principles of data governance, data modeling, and data architecture into a practical five-step approach for designing data and the data production process. For example, the first step may be to identify one or more data quality owner. This leverages the principle of aligning accountability with impact.

Next, the data consumers are identified. The data consumers are the ultimate judge of data quality. This step describes the importance of establishing the producer-consumer relationship to create a feedback loop and to manage the data quality narrative.

Next, the data product is designed. This step differentiates the data container from the data content and provides a guide for designing new data elements.

Next, the data is produced according to the design. This step describes the key components of a robust data production process: ownership, controls, metrics, and governance.

Finally, the produced data is distributed. Smart distribution is the only effective way to continuously identify new data consumers. This step describes the importance of the distribution mechanism in maintaining the producer-consumer relationship.

Figure 1:
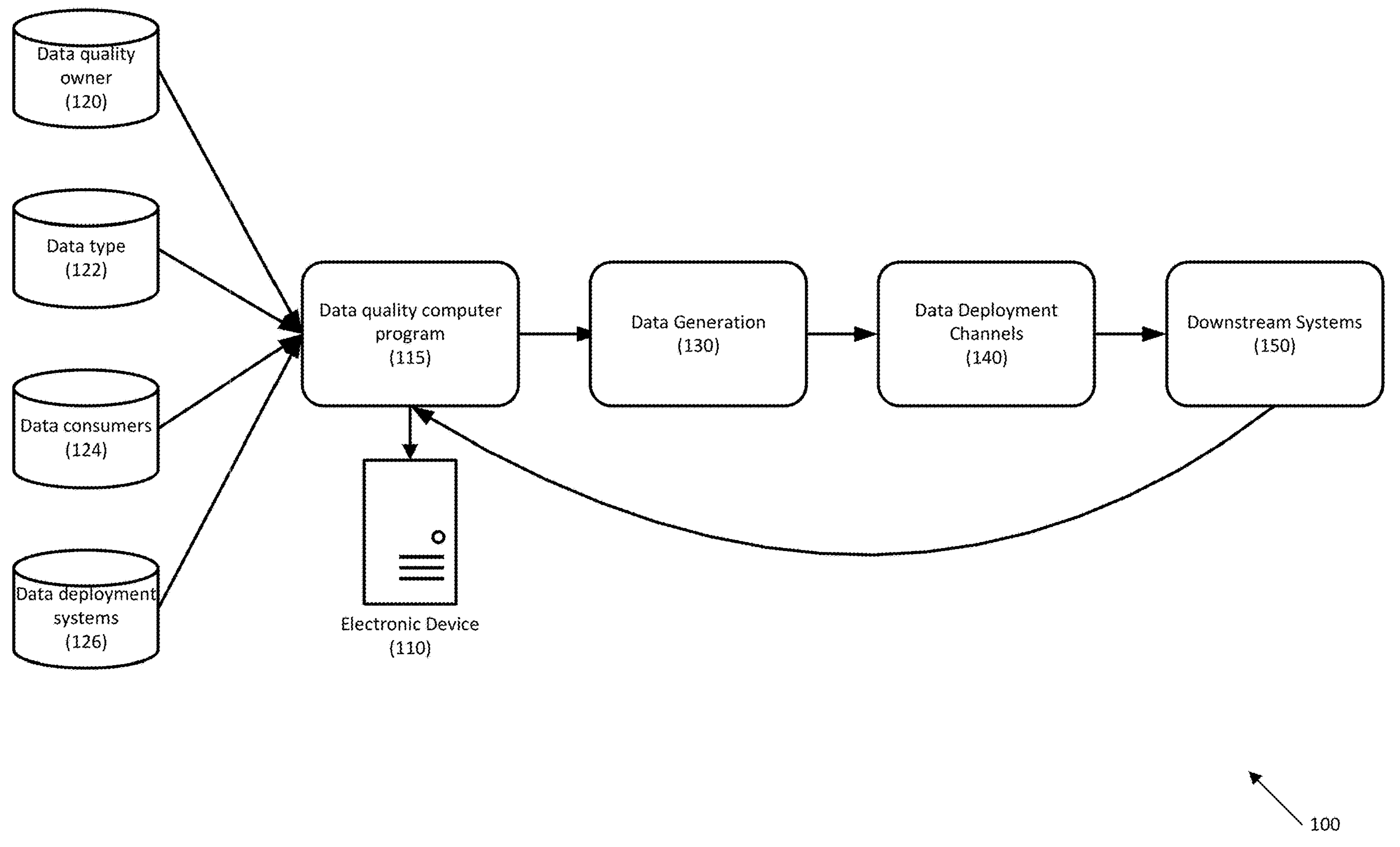
FIG. 1 depicts a system for generating data having a sustainable quality according to an embodiment.

Referring to FIG. 1, a system for generating data having a sustainable quality is illustrated according to an embodiment. System 100 may include electronic device 110, which may be a server (e.g., physical and/or cloud-based), computer (e.g., desktop, laptop, notebook, tablet, etc.), etc. Electronic device 110 may execute data quality computer program 115, which may receive inputs including data quality owner 120, data type 122, data consumers 124, and data deployment systems 126. Data quality computer program 115 may output a data design to one or more systems 130 for data generation, which may deploy the generated data to downstream systems 150 via one or more data deployment channels 140.

A feedback loop may be provided from downstream systems 150 that may allow the consumers of the data to provide feedback to data quality computer program 115.

Figure 2:
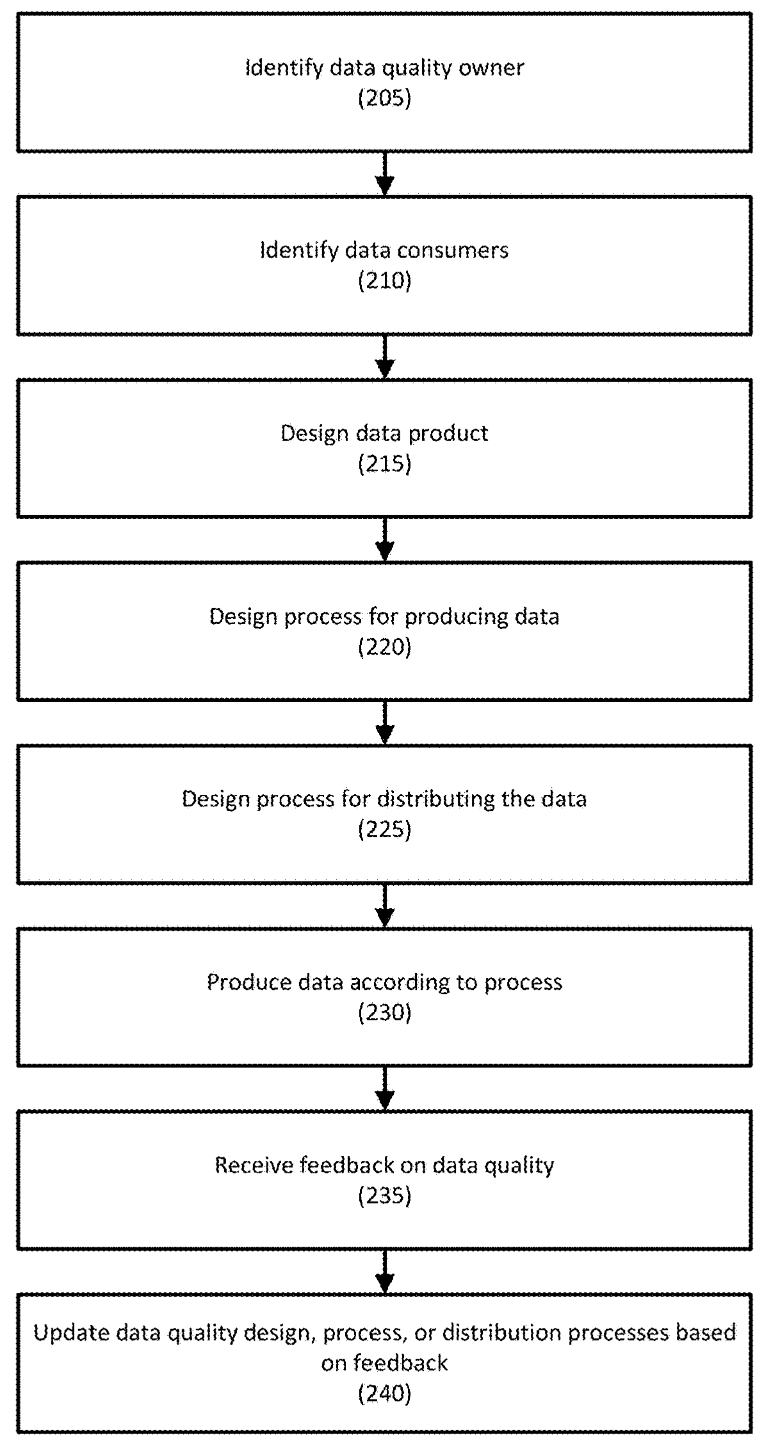
FIG. 2 depicts a method for generating data having a sustainable quality according to an embodiment.

Referring to FIG. 2, a method for generating data having a sustainable quality is illustrated according to an embodiment. In one embodiment, any of the steps in FIG. 2, or combinations of steps, may be performed or supplemented with artificial intelligence or machine learning. For example, trained machine learning algorithms may be used to identify a data owner, identify data consumers, design a data product, design a process for producing data and distributing data, etc. In addition, feedback from data consumers may be used to update the machine learning algorithms.

In step 205, a data quality computer program executed by an electronic device may identify one or more data quality owner. For example, embodiments may assign data quality ownership at a data element level or data group level, align data quality ownership with the business function most impacted by the data, and empower the data quality owner to design the data production process.

In one embodiment, a decision tree may be used to identify the business function the data owner should come from.

When only one business function is using a data element or group of data elements, the data quality owner should reside within that function to align accountability with impact. The data quality owner decision is simple when a function creates data for its own use (e.g., creation of a credit risk rating). When, however, a reporting function or a control function needs a new data element to satisfy a requirement (often a regulatory requirement), obtaining agreement from that function to be the data quality owner may require negotiation. Functions that are heavy data consumers may never have been responsible for data quality. Nonetheless, following the alignment principle yields the best results because no function other than the impacted function has an incentive to get the data right. The data quality owner does not have to produce the data themselves, but they must perform oversight to ensure data quality levels are maintained.

In one embodiment, an algorithm may determine the business function based on these and any other relevant factors.

When there are multiple functions consuming the same data, it is economical to establish a single data quality owner to avoid duplicating efforts. In this case, the type of data— such as master data (i.e., information about objects), transaction data (i.e., information about events), and analytical data (i.e., information used for decision making), may determine which function is best suited to be the data quality owner. It is common for data usage to evolve from one business function to more than one. When this occurs, as long as there is a data quality owner and good controls, there is likely no need to change.

Embodiments may further break master data into three categories: facts, functional classifications, and regulatory classifications. Facts are context-agnostic data that may be validated by comparing the value in a field to an authoritative source such as a business registry, government website, or public document. Facts are often used by multiple business functions. Validating simple facts does not require business-specific knowledge and therefore the data quality owner can reside in a central function that provides data validation services. Simple facts can also be validated using machine learning algorithms that extract content from documents and websites or compare data sets. Some facts, however, require business knowledge to validate. When that is the case, the data quality owner should reside in the function that has this knowledge.

Functional classifications are values assigned by a business function for use by that function (e.g., know your customer assigned industry code used for client due diligence). Responsibility for assignment of functional classifications is often federated out to dozens of individuals. When this is the case, there is typically an independent review or other form of quality control performed on a periodic basis to ensure the assignment process is working as designed. The individual responsible for this control is the logical choice for the data quality owner. The data quality owner must be a single individual, not a collection of people.

Regulatory classifications are context-specific values assigned to satisfy a particular regulatory requirement. Regulatory classifications are most often assigned to counterparties (e.g., classification of counterparties for credit risk capital calculations), but are also assigned to assets (e.g., high quality liquid assets) and liabilities (e.g., non-operating deposits). Regulatory classifications impact a wide range of processes including trading, capital management, liquidity management, and regulatory reporting to name a few. The functions responsible for these processes are heavy data consumers whose job descriptions typically do not include data quality. These functions are, however, experts on the regulatory requirements and they are the functions that interface with the regulators during an exam. They have the incentive to get the regulatory classification right. Hence, the best alignment of accountability and impact is to designate the owner of the report, control, or calculation that is reliant on the regulatory classification as the data quality owner. The data quality owner may rely on another team to assign the classification, but they must perform quality assurance testing to evidence the accuracy of the assignment process.

Transactional data is information about events that occur in the daily operations of the firm such as trade volumes, loan balances, deposit amounts, etc. In financial institutions transaction data is typically governed by Finance or Operations teams that perform reconciliations and variance analysis daily to detect errors. The data quality owner for transactional data should reside within the team that performs the controls.

Analytical data is information used for decision-making. Analytical data includes aggregated data, derived data, and modeled data. It ranges from simple formulas to sophisticated models (e.g., Value at Risk). Identifying a data quality owner for a modeled value is challenging because several inputs are transformed into an output. No one person has full control over the output. The following actors may play a part in the model output:

Model development—design and coding of the model
Model review—independent review of the model
Model governance—oversight of model implementation
Operations—daily production of model output
Risk and Finance—use model output for decision-making The best alignment of accountability and impact is to designate the person who uses the model output for decision-making as the data quality owner.

In one embodiment, a decision tree may be used to identify the data quality owner(s) for a given data element or a group of related data elements. The decision tree may identify the data quality owner by considering, for example, who will use the data and the type of data that will be produced.

Figure 3:
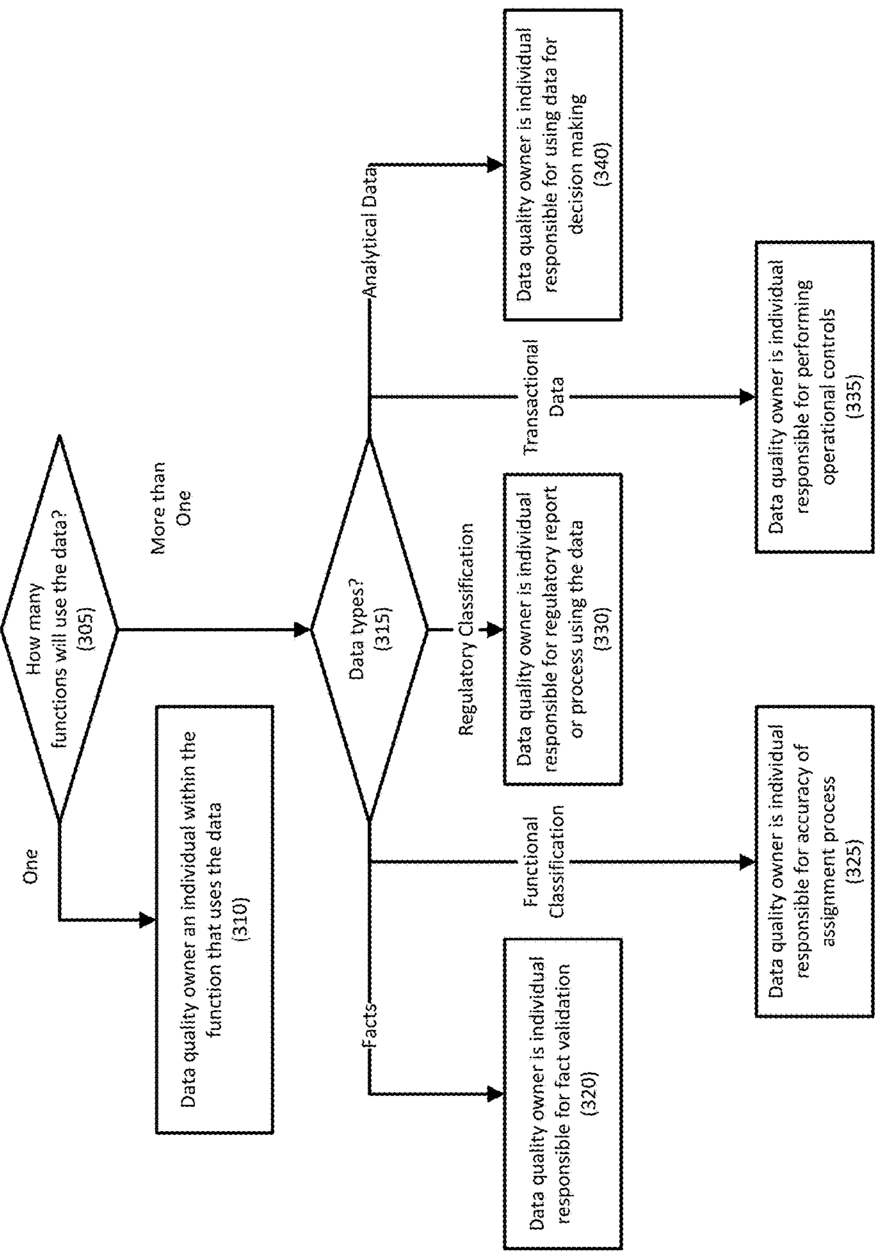
FIG. 3 depicts an exemplary decision tree for identifying a data owner according to an embodiment.

An example decision tree is provided in FIG. 3. For example, in step 305, the data quality computer program may determine how many functions there are for the data. Prior to creating the data element, the number of functions may be determined by assessing requirements and/or use cases. After the data element is produced and distributed, the number of functions may be automatically determined by, for example, analyzing consumption patterns.

In one embodiment, the number of functions may be provided by a human; in another embodiment, the number of functions may be determined from parameters, such as downstream systems, etc.

If there is only one function for the data, in step 310, the data quality owner is determined to be the individual within the function that uses the data.

If there are more than one functions for the data, in step 315, the data quality computer program may determine the data type from, for example the nature of the data. In one embodiment, the information may be provided by a user.

In one embodiment, a trained machine learning engine may determine the data type based on historical information.

If the data type is "facts," in step 320, the data quality owner is the individual responsible for fact validation.

If the data type is "functional classification," in step 325, the data quality owner is the individual responsible for the accuracy of the assignment of the data owner.

If the data type is "regulatory classification," in step 330, the data quality owner is the individual responsible for the regulatory report or the process that uses the data.

If the data type is "transactional data," in step 335, the data quality owner is the individual responsible for performing operational controls on the data.

If the data type is "analytical data," in step 340, the data quality owner is the individual responsible for using the data for decision making.

Referring again to FIG. 2, in step 210, the data quality computer program may identify data consumers. Data producers may manage the perception of data quality just as much as they manage actual data quality. This is true whether the data is used internally or externally.

The best way to manage perception of data quality is to identify consumers and proactively manage the Producer-Consumer relationship. The data quality owner needs to talk to consumers and listen to their pain points. A data producer measures data quality according to the specification for which a data element was created, while a data consumer measures data quality according to whether the available data meets their needs.

The producer's view of data quality may be narrow and scientific, whereas the consumer's view may be expansive, and sentiment driven. Managing perception requires bridging the gap between the two. While it is not the job of the data quality owner to solve all of the data challenges a consumer may have, they can help the consumer navigate the data landscape. This builds trust and understanding which helps with perception.

When new data elements are created, the data quality owner may establish a recurring communication mechanism with data consumers to ensure there is a feedback loop. The data quality owner may present data quality metrics monthly and gather feedback from consumers through face-to-face meetings. Feedback may also be received through surveys, or when a data consumer reports an issue with the data quality.

In step 215, the data quality computer program may design the data product. A data product may include a data container (a field in a database) and data content (the value in the field). The data quality owner may work with a data architect to design the data product. The data quality may describe the content and the data architect may design the container. For example, data architects may use data modeling techniques to define how data is structured, organized, and stored.

In one embodiment, the generation of the container(s) may be automated.

Designing the data product may be a three-step process: (1) describe the content; (2) design the container; and (3) label the container. A detailed and thorough description of the data content is the starting point for designing the data product. A data content description may identify some or all of the following: what does the information relate to (e.g., an organization, a financial instrument, a transaction, a grouping of items); how often does the information change (e.g., frequently, infrequently); when is the information applicable (e.g., maturity date, settlement date, government identifiers, conditions); what information is valid (e.g., regulatory classifications have valid values defined by the regulation, functional classifications have valid values defined by the business function, economic data and modelled data have a valid range of values defined by the data quality owner, facts have parameters that define what is and is not valid (e.g. a U.S. Social Security Number must be 9 digits)); etc.

In one embodiment, a computer program may identify patterns in an existing data set and propose data validation rules.

Next, using the description of the content, the data architect and/or data quality computer program may design a container for the data. This may be referred to as "modeling the data element." Data models define how data elements relate to one another. They group related data elements into data entities and connect data entities using unique identifiers. Data models serve as a backbone for enforcing data integrity. Data models make it easier to manage data quality by enabling assignment of data quality owners at a data entity level. They also make it easier to manage access control by enabling entitlements at a data entity level.

In addition to modeling the data element, the data architect will determine the appropriate system of record (SOR) for the data. The SOR is the system in which the data product is created and maintained. Other systems may consume the data product from the SOR, but they may not change the content of the data, or they are by definition creating a new data product.

The SOR for a data product may be the system for which the data quality owner has influence over the budget. Creation of a data product is seldom a one and done process. There are usually enhancements to a data product throughout its life; therefore, it is beneficial for the data quality owner to have control over the budget for the SOR.

Next, the data architect and/or data quality computer program may label the container. It is important to properly label the data container to prevent consumption of data that is not fit for purpose of the consumption. The label provides the consumer enough information to determine whether the product is fit for its purpose, including the data element name, a description of the content, an intended use of the content, and a system of record of the content.

In one embodiment, the labeling may be achieved using an automated process to identify the data element name, description, intended use, and/or system of record.

Well-constructed data element names are important for preventing consumption that is not fit for purpose. Generically named data elements such as "entity type" often get used beyond their original purpose resulting in a proliferation of valid values as each additional consumer asks for "just one more." When this happens, the data element is no longer fit for its original purpose.

In one embodiment, data elements that are used for classification may be labeled with the name of the regulation or function for which the data element was created. Data consumers will know that the data element serves a specific purpose and will not use it unless it exactly matches their needs. Examples include regulatory classification data elements (e.g., QFC Entity Type, FRB Structure Reporting Entity Type—valid values are defined by FRB, NCMR Regulatory Group), functional classification data elements (e.g., KYC Entity Type, AML Risk Rating, Credit-Assigned Industry Code), etc.

Once the container has been designed, the focus shifts to filling the container with content.

In step 220, the data architect and/or data quality computer program may design process for producing the data. In one embodiment, the level of quality required for particular data element will determine the level of rigor required in the production process. More rigor means more cost; therefore, it is important to differentiate which data requires a high degree of quality and which data does not. For example, data used for prospecting new clients likely will not require the same degree of quality as data used for financial reporting.

The type of the data being created (e.g., facts, classifications, economic values, etc.) may also influence the production process. Common mechanisms for data creation include manual entry (e.g., manually populating a field by typing or by selecting a value), vendor sourced (e.g., systematically populating a field with content sourced from a vendor), automated extraction (e.g., systematically populating a field with content extracted from a document), and derived or calculated (e.g., systematically populating a field with derived or calculated content). Regardless of the data creation mechanism, sustainable data quality requires a production process that is owned, controlled, measured, and governed.

The data quality owner may also own the data production process; however, there are cases where the data quality owner will rely on another team to produce and maintain the data. In either case, the data quality owner may be responsible for ensuring the production process is controlled, measured, and governed. When the data quality owner is not the owner of the production process, the data quality owner works in partnership with the process owner to design the controls, metrics, and governance.

Designing the data quality production process may also include designing data quality controls. Both preventive and detective controls may be used to ensure sustainable data quality. Preventive controls may be performed before data is published in a system and detective controls may be performed after data is published. In other words, preventive controls prevent poor quality data from entering a system, while detective controls detect poor quality data already in a system.

Data quality controls may be systematic for speed, efficiency, and scalability. In principle, the role of individuals in the control process may be for exception management only.

The matrix in FIG. 4 provides examples of the types of controls that are commonly used for a given data type and data creation mechanism. Cells marked "NA" indicate the data type is not typically created using that mechanism (e.g., analytical data is not typically created by manual entry).

Validation rules are systematic data validation rules that generate an exception if content does not meet the parameters defined in the Data Product Specification. Validation rules may be used as both a preventive control before data is published and a detective control after data is published. For example, validation rules may be based on the type of data being created. For manual entry data, a user may not be able to progress to next step until the exception is resolved. For vendor-sourced data, exceptions may be communicated to the vendor for correction. For automated extraction data, exceptions may be corrected by operations. And for derived or calculated data, exceptions may be corrected by operations.

For comparison to authoritative source controls, an individual or a system may compare data entered manually to an authoritative source such as a legal agreement or business registry to confirm accuracy.

Reconciliations may involve systematic reconciliations between data sets to ensure consistency.

Variance triggers may provide an automated control that generates an exception if a value varies by more than an expected amount or is outside an expected range.

Variance analysis may include an analysis performed to explain the variance in a value. The analysis will either validate or invalidate the variation.

Sample testing may involve an independent review of a sample population to measure the effectiveness of the primary control.

In embodiments, metrics may govern the effectiveness of data production process and for communicating the quality of the data to consumers. The data producer is responsible for measuring both data quality and process performance. The metrics should answer the questions: Is the process producing high quality data? Is the process timely? And is the process efficient?

Data quality may be measured using the output of the data validation rules run on the published data. A data quality score may be calculated by diving the number of data validation exceptions by the total number of opportunities for an exception. In one embodiment, the data validation rules may be calibrated to reduce false positive exceptions before the resulting score is a meaningful indicator of quality.

To make the score meaningful, the data quality owner may establish thresholds for what constitutes good, fair, and poor quality for a given data element. The thresholds may depend on the context in which the data element is used and the tolerance of the data consumers. Thresholds allow the data producer to show the quality of the data on a dashboard in a manner that is easily digestible. Dashboards may also display the data quality score as a trend line over time to demonstrate whether the quality is improving, stable, or declining.

Timeliness metrics may capture both cycle time for data creation and how often that cycle time exceeds the service level agreement (SLA). Efficiency measures may identify whether there are manual processes that could be done faster or eliminated.

Governance processes are designed to:

Reinforce accountability for data quality,

Provide transparency to data consumers, and

Drive responsiveness to data consumer feedback

In step 225, the data quality computer program may design the process for distributing the data. For example, the application hosting the data element may have existing mechanisms available for distributing data. A technologist may determine which mechanism to use for the new data element.

Embodiments may facilitate smart distribution of data. Smart distribution refers to distribution mechanisms that allow the data producer to systematically identify data consumers. Currently, the most common data distribution mechanism is an application interface (API) where a system of record provides access to its data via "messages" that a consuming application can subscribe to. Messages are typically constructed widely with hundreds of data elements to satisfy the needs of a broad range of consuming applications. This approach to data distribution is more efficient than the prior approach where custom files were created for each consuming application. Unfortunately, the data producer no longer has insight into which data elements a consuming application is landing in their system. The data producer only knows that the consuming application has subscribed to the message. As a result, when a data quality owner wants to make a change to a data element, they have to query every application that has subscribed to the message to determine if they are impacted. While widely constructed messages are efficient from a Technology perspective, they are inefficient from a data management perspective.

An alternative is for a system to provide narrower messages, each containing a subset of related data elements from the SOR. The subscribing application selects only the messages they need, like ordering from a menu. Narrower messages enable more precise identification of data consumers, making consumer engagement and change management easier for the data producer.

Subscriber contracts are a mechanism for documenting what and how a consuming application will use data from an SOR. Subscriber contracts are a valuable control for ensuring data is fit-for-purpose before the subscribing application consumes it. Since subscriber contracts are largely manual, they do not provide a real time picture of data consumption. Fortunately, innovative technologies have been developed that can systematically track which data elements a subscribing application has landed in their database. These technologies allow the data producer to identify consumption at a data element level. This is a significant advancement in the ability for a data producer to continuously identify their consumers.

Given the importance of identifying data consumers for managing data quality and managing change, the data producer should work with the data architect to define a distribution mechanism that provides the best balance of technical efficiency and data governance efficiency.

It is necessary to distinguish between data elements landing in a database and data elements being used by a person or process. Identifying true data usage is a step beyond data distribution, but it is worth mentioning because only a person can provide feedback on whether a data element is meeting their needs. The following mechanisms are used to identify data usage by individuals.

Entitlements—entitlements indicate who has the ability to view or export a data element from a system. Entitlements provide an indication of who is interested in the data.

Artificial intelligence—AI algorithms can monitor clicks on a field and can identify who exported specific data elements from a system by analyzing export history from a system's audit logs.

Engagement—ongoing interaction with data consumers will naturally surface the data elements they use the most.

Tracking data usage on a person-by-person level is a growing discipline. Emerging technologies will greatly benefit data producers looking to proactively manage the producer-consumer relationship.

In step 230, the data quality computer program may provide data product design, the process for producing data, and the process for distributing data to the systems that are generating the data. The system(s) may then produce the data and distribute the data according to the information received from the data quality computer program.

In step 235, the data quality computer program may receive feedback on the data quality. For example, feedback may be received manually (e.g., from data consumers), inferred from emails, comments, etc. from consumers, etc. The feedback may also be received via the application of data validation rules to the data.

Governance forums monitor the quality of the data product, the performance of the production process, and consumer satisfaction. The quality of the data product and consumer satisfaction are separate measures. Data quality can be near 100% and the consumer can be dissatisfied because the data is not fit-for-purpose for their use case. Ongoing communication with data consumers is the best way to find out whether the data being produced meets their needs.

Embodiments may provide a Consumer Engagement Forum that is a mechanism for fostering the producer-consumer feedback loop. The data quality owner presents data quality metrics and listens to feedback from data consumers. Because most data consumers do not differentiate between poor data quality and data that is not fit for purpose, the forum is an opportunity for the data quality owner to explain the difference and help data consumers find the right source of data that meets their needs.

Embodiments may engage senior management as part of the governance process and as part of managing the data quality narrative. Proactive senior management engagement allows the data producer's voice to be heard. Sustainable data quality requires data producers to be champions of their data and to influence perception of their data.

In step 240, the data quality computer program may use the feedback to update the data design and/or the data production design. For example, feedback on quality may impact data design if there were a defect in how the data element was designed.

Figure 5:
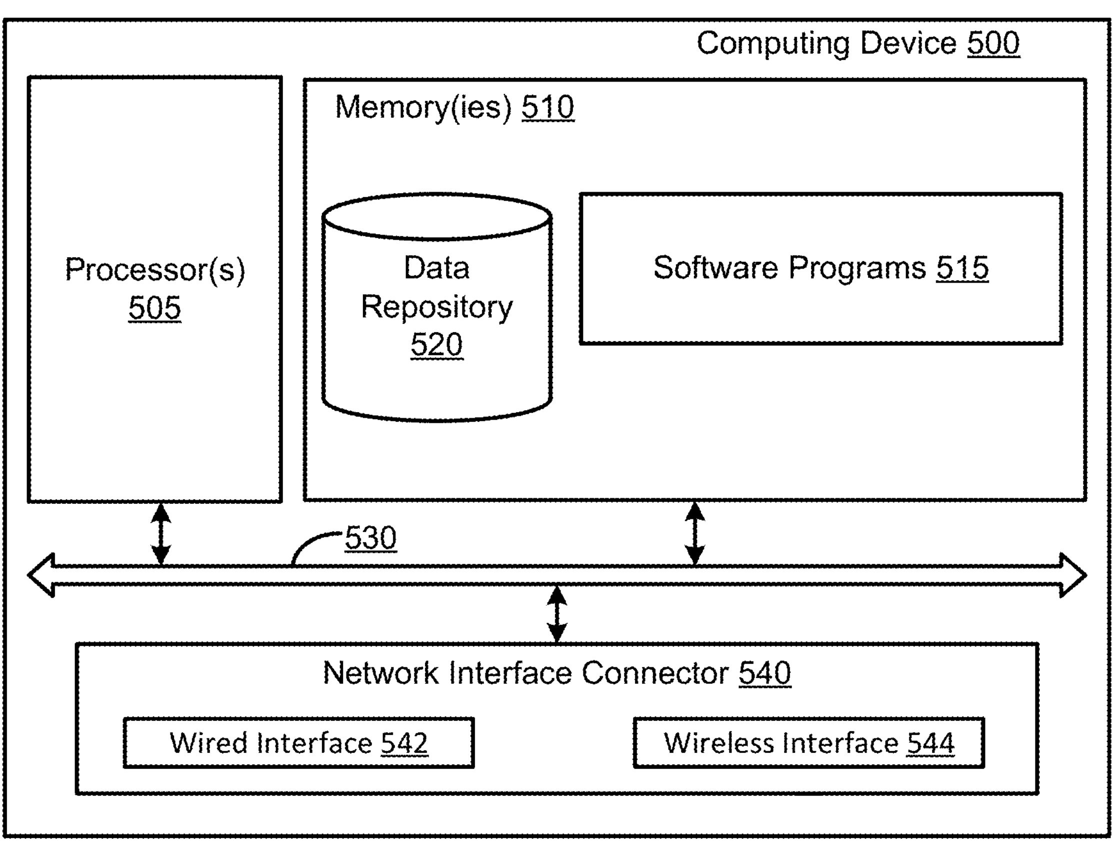
FIG. 5 depicts an exemplary computing system for implementing aspects of the present disclosure.

FIG. 5 depicts an exemplary computing system for implementing aspects of the present disclosure. FIG. 5 depicts exemplary computing device 500. Computing device 500 may represent the system components described herein. Computing device 500 may include processor 505 that may be coupled to memory 510. Memory 510 may include volatile memory. Processor 505 may execute computer-executable program code stored in memory 510, such as software programs 515. Software programs 515 may include one or more of the logical steps disclosed herein as a programmatic instruction, which may be executed by processor 505. Memory 510 may also include data repository 520, which may be nonvolatile memory for data persistence. Processor 505 and memory 510 may be coupled by bus 530. Bus 530 may also be coupled to one or more network interface connectors 540, such as wired network interface 542 or wireless network interface 544. Computing device 500 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for generating data having a sustainable quality, comprising:

determining, by a machine learning model of a computer program executed by an electronic device, an identification of a data quality owner for a data element of a data to be produced, wherein the identification includes:

determining a number of functions from a number of downstream systems that use the data, the number of functions being determined by assessing requirements and/or use cases prior to creating the data element and, after distribution, by automatically analyzing consumption patterns;

identifying each downstream system;

determining a data type from the data element and a category of the data, wherein the data category is selected from a group comprising a fact, a functional classification, a regulatory classification, a transactional data, and an analytical data; and selecting the identified downstream system as the data quality owner based on a use of the identified downstream system and the data category, according to a decision tree;

determining, by the machine learning model of the computer program, an identification of a data consumer of the data to be produced by accessing a message from the data consumer's application as a result of the data element being used, the message being emitted when a subscribing application consumes a subset of related data elements;

determining, by the machine learning model of the computer program, a design for a data product by differentiating a data container of the data element from a data content of the data element and then defining a field using a description of the data content, a label for the field, and a value in the field, the label being selected to comply with the category of the data and to identify a regulation or function for which the data element was created;

determining, by the machine learning model of the computer program, a process for producing the data including a preventative control and a detective control, the preventative control comprising systematic validation rules enforced before publication of the data and the detective control comprising validation rules enforced after publication of the data;

receiving, by a data producing system, a process for distributing the data, the process providing messages that enable identification of data consumers;

producing, by the data producing system, the data according to the design and the process for producing the data;

distributing, by the data producing system, the data according to the process for distributing the data;

receiving, by the computer program, feedback on the data; and updating, by the computer program, the machine learning model identification of the data owner, identification of the data consumer, design of the data produced, design of the process for producing and distributing data based on the feedback, the feedback being used to train the machine learning model.

2. The method of claim 1, further comprising:

automatically labeling the data container based on a data element name, description, an intended use for the data, and a system of record.

3. The method of claim 1, further comprising:

identifying, by the computer program, data quality controls on the process for producing data.

4. The method of claim 1, further comprising:

validating, by the computer program, the data produced.

5. The method of claim 4, further comprising:

scoring, by the computer program, a data quality of the data based on an output of the validation.

6. A non-transitory computer readable storage medium, including instructions stored thereon, which when read and executed by one or more computer processors, cause the one or more computer processors to perform steps comprising:

determining, by a machine learning model, an identification of a data quality owner for a data element of a data to be produced, wherein the identification includes:

determining a number of functions from a number of downstream systems that use the data, the number of functions being determined by assessing requirements and/or use cases prior to creating the data element and, after distribution, by automatically analyzing consumption patterns;

identifying each downstream system;

determining a data type from the data element and a category of the data, wherein the data category is selected from a group comprising a fact, a functional classification, a regulatory classification, a transactional data, and an analytical data; and selecting the identified downstream system as the data quality owner based on a use of the identified downstream system and the data category, according to a decision tree;

determining, by the machine learning model, an identification of a data consumer of the data to be produced by accessing a message from the data consumer's application as a result of the data element being used, the message being emitted when a subscribing application consumes a subset of related data elements;

determining, by the machine learning model, a design for a data product by differentiating a data container of the data element from a data content of the data element and then defining a field using a description of the data content, a label for the field, and a value in the field, the label being selected to comply with the category of the data and to identify a regulation or function for which the data element was created;

determining, by the machine learning model, a process for producing the data including a preventative control and a detective control, the preventative control comprising systematic validation rules enforced before publication of the data and the detective control comprising validation rules enforced after publication of the data;

identifying data quality controls on the process for producing data;

automatically labeling the data container based on a data element name, description, an intended use for the data, and a system of record;

receiving, by a data producing system, a process for distributing the data, the process providing messages that enable identification of data consumers;

producing, by the data producing system, the data according to the design and the process for producing the data;

validating, by the data producing system, the data produced;

scoring, by the data producing system, a data quality of the data based on an output of the validation;

distributing, by the data producing system, the data according to the process for distributing the data;

receiving feedback on the data; and updating the machine learning model identification of the data owner, identification of the data consumer, design of the data produced, design of the process for producing and distributing data based on the feedback, the feedback being used to train the machine learning model.

* * * * *